United States Patent
Cheng et al.

(10) Patent No.: US 7,515,579 B2
(45) Date of Patent: Apr. 7, 2009

(54) DYNAMIC SWITCHING OF A TRANSMISSION TIME INTERVAL IN A WIRELESS SYSTEM

(75) Inventors: Fang-Chen Cheng, Randolph, NJ (US); Shupeng Li, Edison, NJ (US); Yifei Yuan, Kearny, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 317 days.

(21) Appl. No.: 11/055,019

(22) Filed: Feb. 9, 2005

(65) Prior Publication Data

US 2006/0176869 A1    Aug. 10, 2006

(51) Int. Cl.
*H04J 3/00* (2006.01)

(52) U.S. Cl. ............ 370/345; 370/332; 455/452.2

(58) Field of Classification Search .......... 370/345, 370/315, 319, 328, 329, 331, 332, 335, 336; 455/507, 515, 517, 522, 450, 452.1, 452.2
See application file for complete search history.

(56) References Cited

U.S. PATENT DOCUMENTS

| | | | |
|---|---|---|---|
| 7,012,911 B2 * | 3/2006 | Kasturi et al. ............ 370/342 |
| 7,061,913 B1 * | 6/2006 | Abrol et al. ............ 370/394 |
| 2002/0021682 A1 * | 2/2002 | Ariyoshi et al. ............ 370/335 |
| 2003/0123396 A1 * | 7/2003 | Seo et al. ............ 370/252 |
| 2003/0193948 A1 * | 10/2003 | Hatae et al. ............ 370/392 |
| 2004/0058699 A1 * | 3/2004 | Jonsson et al. ............ 455/522 |
| 2005/0111397 A1 * | 5/2005 | Attar et al. ............ 370/319 |
| 2005/0190722 A1 * | 9/2005 | Moon et al. ............ 370/328 |
| 2006/0215592 A1 * | 9/2006 | Tomoe et al. ............ 370/315 |
| 2006/0217141 A1 * | 9/2006 | Legg et al. ............ 455/522 |

OTHER PUBLICATIONS

36PP TSG-RAN 1 WG1 #36, R1-04-0358; Qualcomm Europe "Further Results on E-DCH System Performance with Full Buffer—2ms vs. 0ms—Different E-TFCS," Malaga, Spain, Feb. 16-20, 2004.
3GPP TSG-RAN WG1 AhHoc, R1-040703; Lucent "Joint Support of 2ms and 10ms TTI for EDCH," Cannes, Franc, Jun. 21-24, 2004.
3GPP TSG-RAN 1 #34, R1-03-1237; Qualcomm Europe "TP on UL E-TFC Signaling," Lisbon, Portugal, Nov. 17-21, 2003.

* cited by examiner

*Primary Examiner*—Nhan T Le

(57) ABSTRACT

A method is provided for controlling a wireless communications system. The method comprises dynamically selecting one of a first and second transmission time interval for communications over a channel between a first and second device based on at least one operating characteristic of the channel.

10 Claims, 3 Drawing Sheets

DYNAMIC SWITCHING OF A TRANSMISSION TIME INTERVAL IN A WIRELESS SYSTEM

BACKGROUND OF THE INVENTION

1. Field of the Invention

This invention relates generally to telecommunications, and, more particularly, to wireless communications.

2. Description of the Related Art

In the field of wireless telecommunications, such as cellular telephony, a system typically includes a plurality of base stations distributed within an area to be serviced by the system. Various users within the area, fixed or mobile, may then access the system and, thus, other interconnected telecommunications systems, via one or more of the base stations. Typically, a mobile device maintains communications with the system as the mobile device passes through an area by communicating with one and then another base station, as the user moves. The mobile device may communicate with the closest base station, the base station with the strongest signal, the base station with a capacity sufficient to accept communications, etc., and it may do so over one or more wireless channels.

Typically, the mobile devices communicate with the base stations at fixed intervals. For example, the mobile station is permitted to transmit a segment of data during a first preselected period of time. At the expiration of the first period of time, the mobile station is permitted to transmit a new segment of data, and so on. Transmission of each segment of data must be completed within its designated period of time, or the transmission is unsuccessful and must be repeated.

Accordingly, it will be appreciated that large amounts of data can be delivered if the period of time is set at a relatively short value (e.g., 2 ms). However, if the channel is subjected to non-ideal conditions (e.g., noise, interference, etc.), then a successful transmission may not be achieved within the relatively short time period. Extending the period of time (e.g., 10 ms) may allow transmissions to successfully complete in less than ideal conditions, but the data will be delivered at a substantially reduced rate. Moreover, those skilled in the art will appreciate that channel conditions may vary dramatically over relatively short periods of time, and thus, a static time interval may produce desirable transmission rates for only limited periods of time.

The present invention is directed to overcoming, or at least reducing, the effects of one or more of the problems set forth above.

SUMMARY OF THE INVENTION

In one aspect of the instant invention, a method is provided for controlling a communications system. The method comprises selecting one of a first and second transmission time interval for communications over a channel between a first and second device based on at least one operating characteristic of the channel.

BRIEF DESCRIPTION OF THE DRAWINGS

The invention may be understood by reference to the following description taken in conjunction with the accompanying drawings, in which like reference numerals identify like elements, and in which.

Figure 1:
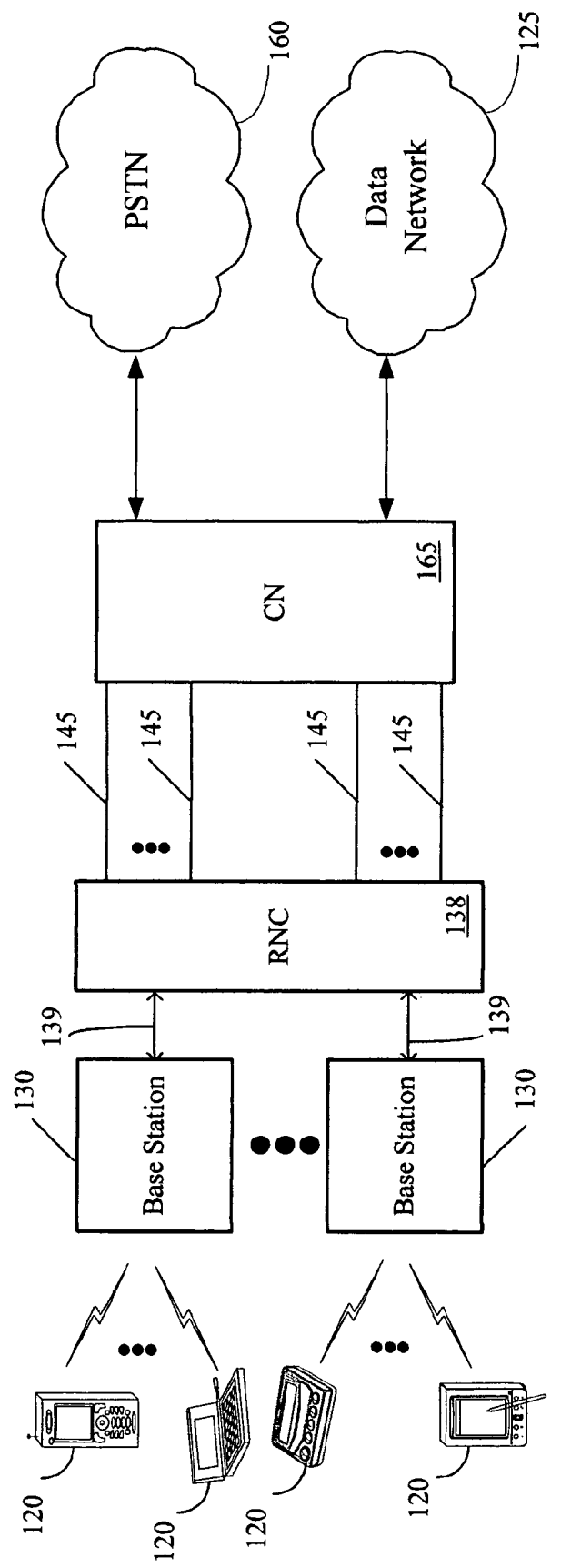
FIG. 1 is a block diagram of a communications system, in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which may vary from one implementation to another. Moreover, it will be appreciated that such a development effort might be complex and time-consuming, but may nevertheless be a routine undertaking for those of ordinary skill in the art having the benefit of this disclosure.

Turning now to the drawings, and specifically referring to FIG. 1, a communications system 100 is illustrated, in accordance with one embodiment of the present invention. For illustrative purposes, the communications system 100 of FIG. 1 is a Universal Mobile Telephone System (UMTS), although it should be understood that the present invention may be applicable to other systems that support data and/or voice communication. The communications system 100 allows one or more mobile devices 120 to communicate with a data network 125, such as the Internet, and/or a public telephone system (PSTN) 160 through one or more base stations 130. The mobile device 120 may take the form of any of a variety of devices, including cellular phones, personal digital assistants (PDAs), laptop computers, digital pagers, wireless cards, and any other device capable of accessing the data network 125 and/or the PSTN 160 through the base station 130.

In one embodiment, a plurality of the base stations 130 may be coupled to a Radio Network Controller (RNC) 138 by one or more connections 139, such as T1/EI lines or circuits, ATM virtual circuits, cables, optical digital subscriber lines (DSLs), Ethernet, and the like. Although one RNC 138 is illustrated, those skilled in the art will appreciate that a plurality of RNCs 138 may be utilized to interface with a large number of base stations 130. Generally, the RNC 138 operates to control and coordinate the base stations 130 to which it is connected. The RNC 138 of FIG. 1 generally provides replication, communications, runtime, and system management services, and may be involved in coordinating the transition of a mobile device 120 during transitions between the base stations 130.

The RNC 138 is also coupled to a Core Network (CN) 165 via a connection 145, which may take on any of a variety of forms, such as T1/EI lines or circuits, ATM virtual circuits, cables, optical digital subscriber lines (DSLs), Ethernet, and the like. Generally the CN 165 operates as an interface to the data network 125 and/or to the public telephone system (PSTN) 160. The CN 165 performs a variety of functions and operations, such as user authentication, however, a detailed description of the structure and operation of the CN 165 is not necessary to an understanding and appreciation of the instant invention. Accordingly, to avoid unnecessarily obfuscating the instant invention, further details of the CN 165 are not presented herein.

Thus, those skilled in the art will appreciate that the communications system 100 enables the mobile devices 120 to communicate with the data network 125 and/or the PSTN 160. It should be understood, however, that the configuration of the communications system 100 of FIG. 1 is exemplary in nature, and that fewer or additional components may be employed in other embodiments of the communications system 100 without departing from the spirit and scope of the instant invention.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system's memories or registers or other such information storage, transmission or display devices.

Figure 2:
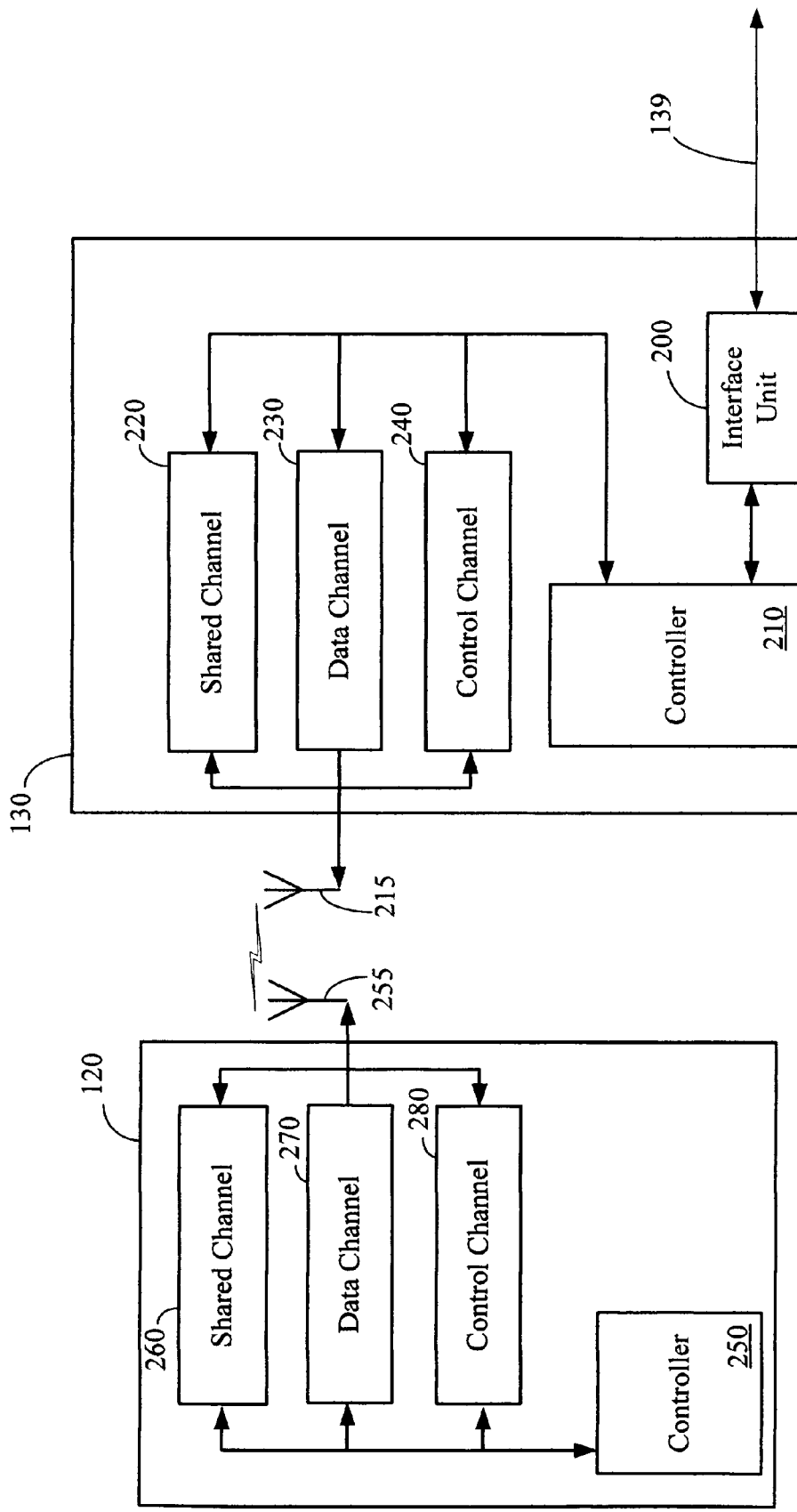
FIG. 2 depicts a block diagram of one embodiment of a Base station and a mobile device used in the communications system of FIG. 1.

Referring now to FIG. 2, a block diagram of one embodiment of a functional structure associated with an exemplary base station 130 and mobile device 120 is shown. The base station 130 includes an interface unit 200, a controller 210, an antenna 215 and a plurality of channels: such as a shared channel 220, a data channel 230, and a control channel 240. The interface unit 200, in the illustrated embodiment, controls the flow of information between the base station 130 and the RNC 138 (see FIG. 1). The controller 210 generally operates to control both the transmission and reception of data and control signals over the antenna 215 and the plurality of channels 220, 230, 240 and to communicate at least portions of the received information to the RNC 138 via the interface unit 200.

The mobile device 120 shares certain functional attributes with the base station 130. For example, the mobile device 120 includes a controller 250, an antenna 255 and a plurality of channels: such as a shared channel 260, a data channel 270, and a control channel 280. The controller 250 generally operates to control both the transmission and reception of data and control signals over the antenna 255 and the plurality of channels 260, 270, 280.

Normally, the channels 260, 270, 280 in the mobile device 120 communicate with the corresponding channels 220, 230, 240 in the base station 130. Under the operation of the controllers 210, 250, the channels 220, 260; 230, 270; 240, 280 are used to effect a controlled scheduling of communications from the mobile device 120 to the base station 130.

In one embodiment of the instant invention, the communications system 100 is configured to dynamically switch between a communications scheme that utilizes a 2 ms Transmission Time Interval (TTI) and a 10 ms TTI, depending upon the operating characteristics of the channel over which the communications system 100 is sending/receiving information. Generally, the communications system 100 is configured such that the mobile device 120 uses the 2 ms TTI during periods of time in which a higher quality radio channel environment exists and the 10 ms TTI during periods of time in which a lower quality radio channel condition exists.

Figure 3:
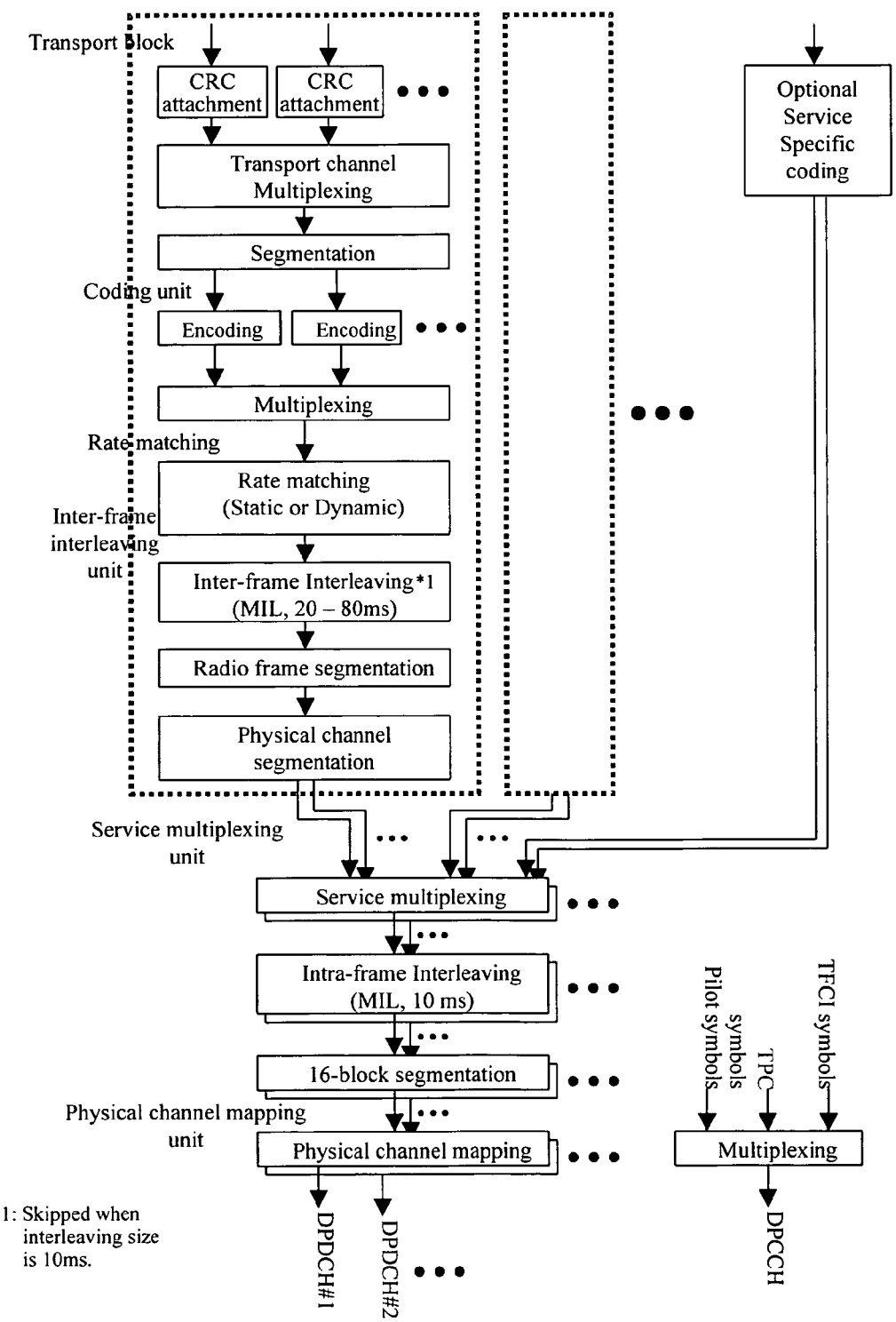
FIG. 3 is a flow diagram illustrating a processing component chain of a data channel of the communications system of FIG. 2 for dynamic switching of transmission time intervals.

Turning now to FIG. 3, a flow diagram illustrating the signal processing of the data channels 230, 270 of the system 100 is shown. Those skilled in the art will appreciate that the methodology described below in conjunction with FIG. 3 may be accomplished by software operating in a computing device associated with the data channel 230, 270 (See FIG. 2), by hardware, or by a combination of hardware and software. Further, a controller programmed or designed to provide the functionality of FIG. 3 may be located wholly, or at least partially, at various cites in the communications 100, such as in the mobile device 120 and the base station 130. Alternatively, it may be possible in other embodiments of the instant invention to locate a controller within the RNC 138, the CN 165, or at various other locations within the system 100.

In one embodiment of the instant invention, the operating characteristics of the wireless channel established between the mobile device 120 and the base station 130 are measured or determined at the mobile device 120. The channel condition may be determined at the mobile device 120 by measuring or determining a ratio of the received power spectrum density to the interference power spectrum density for a designated channel. The mobile device 120 may initiate a switch between the 2 ms and 10 ms TTI based on the measured or determined ratio. Generally, it has been observed that the dynamic switching scheme provides an approximate 10% throughput improvement over that of systems that employ 2 ms and 10 ms TTI only.

In one embodiment of the instant invention, autonomous switching between 2 ms and 10 ms TTI for an enhanced uplink channel is described. However, those skilled in the art will appreciate that the instant invention may find application in a wide variety of channels, including both uplink and downlink channels.

The process of selecting between 2 ms and 10 ms TTI is controlled in the base station 130 via a Medium Access Control E-DCH (MAC-E). As is conceptually shown in FIG. 3, the MAC-E is generally responsible for mapping the varied priorities of service classes into the transport channel and managing Hyrbid Acknowledgment Requests (HARQ). Controlling the dynamic switching between 2 ms and 10 ms TTI in the MAC-E allows the switching to be accomplished with only a relatively short delay, as the base station 130 is already responsible for scheduling control, whereas the mobile device 120 is responsible for resource management.

Generally, the MAC-E uses the operating characteristics of the channel to select between the 2 ms and 10 ms TTI. That is, when the ratio of the received power spectrum density to the interference power spectrum density rises above a preselected setpoint, indicating relatively good channel conditions, the MAC-E directs the software to notify the mobile device 120 to transmit using the 2 ms TTI, as is shown in the branch 300. Alternatively, when the ratio of the received power spectrum density to the interference power spectrum density falls below a preselected setpoint, indicating poorer channel conditions, the MAC-E directs the software to notify the mobile device 120 to transmit using the 10 ms TTI, as is shown in the branch 305.

The dynamic TTI switching scheme includes a radio sub-frame structure design, E-DCH Frame Number (EFN) and timing for the radio sub-frame, dynamic switching constraints, and E-DCH Transport Format Indication (E-TFI) are designed to support dynamic switching.

In one embodiment of the instant invention, as shown in FIG. 3 at 310, a new 2 ms TTI Radio Sub-frame may be used for the physical channel for both 2 ms and 10 ms TTI transport channels. The 10 ms TTI transport channel uses the radio sub-frame segmentation 315 and rate matching 320 to map onto the 2 ms radio sub-frame. An interleaver may be used for the 2 ms radio sub-frame to allow relatively fast deinterleaving of the 2 ms TTI data at the receiver. With the existence of E-DCH, the up-link long scrambling code is proposed to terminate at the 2 ms radio sub-frame. The long scrambling sequences may be constructed from position-wise modulo 2 sum of 7680 chip segments of two binary m-sequences generated by two generator polynomials of degree 25 to replace that of 38400 chip segments in current 10 ms radio frame structure.

In one embodiment of the instant invention, the E-DCH Coded Composite Transport CHannel (CCTrCH) is aligned with R99 DCH CCTrCH in time. A radio sub-frame counter for the E-DCH may be derived from the Connection Frame Number (CFN) of the DCH. The E-DCH frame counter, named EFN, may have a 12-bit length with range from 0 to 1279, and may function as follows:

$$EFN = 5*CFN + I_{sub}, \text{ where } \begin{Bmatrix} CFN = 0, 1, \ldots, 127 \\ I_{sub} = 0, 1, \ldots, 4 \end{Bmatrix}$$

During transitions between the 2 ms and 10 ms TTI it may be useful in one embodiment of the instant invention to invoke the following guidelines:

1. Completion of all HARQ processes—Once the TTI switching is triggered, no new HARQ process is assigned. The transport channel processor of existing TTI length receives no new data from MAC-E.
    a. Switching from 2 ms to 10 ms TTI: the 10 ms TTI will not start until all the on-going HARQ processes are completed. With synchronous HARQ, the intermediate TTI interval will be DTX with no new HARQ assigned during the tail end of other 2 ms HARQ processes.
    b. Switching from 10 ms to 2 ms TTI: the time to complete all HARQ processes for the 10 ms TTI transport channels might be long. Thus, new HARQ processes for the 2 ms TTI should start at the TTI interval with idle 10 ms TTI HARQ processors.
2. Transition at the radio frame boundary—The mobile device 120 starts the transition of E-DCH TTI switching at the 10 ms frame boundary (EFN mod 5=0). The setting of the transition time of E-DCH TTI switching at the radio frame boundary allows the E-DCH to have timing alignment with the DCH.

An E-DCH Transport Format Indication (E-TFI) for E-DCH may be used to indicate the transport block size. To support 2 ms and 10 ms TTI, the E-TFI may be independently decoded every 2 ms but is able to be extended and combined for the 10 ms TTI. In one embodiment of the instant invention, an N-bit E-TFI field is decoded every 2 ms. The N-bit is block encoded to K coded symbols for error control.

In one embodiment of the instant invention, the E-TFI design to support 2 ms and 10 ms TTI is as follows:

The values from 0 to $2^N-2$ of the N-bit E-TFI are used to indicate the transport format of the Transport Format Combination Set (TFCS) subset during the 2 ms TTI. A total of $2^N-1$ transport formats are supported for the 2 ms TTI.

The value $2^N-1$ (N-bit all 1's) of the N-bit E-TFI field is used as the extended field for the 10 ms TTI TFCS indication. The value $2^N-1$ is assigned at the first sub-frame of a radio frame interval, which EFN mod 5=0 as the indication of the 10 ms TTI. The 4×N reminder bits of the E-TFI distributed in the next 4 radio sub-frames (EFN mod 5≠0) may be used to indicate the transport formats of the TFCS subset for the 10 ms TTI transport channel. Thus, there are total of $4 \times (2^N-1)$ transport formats for the 10 ms TTI.

The value N and the code rate may be determined based on the range of the transport format subset support. One example of the (K, N) design could be to reuse the Reed Muller (16, 5) bi-orthogonal code for the DCH TFCI hard split mode. In this example, N equals 5. Thus, 31 transport formats for the 2 ms TTI and 124 transport formats for the 10 ms TTI TFCS subset are provided.

Dynamically switching between 2 ms and 10 ms TTI allows autonomous switching at the mobile device 120 and detection at the base station 130 without L1 or L3 signaling. The switching control between 2 ms and 10 ms could be initiated by the mobile device 120 based on the measurements or environment (e.g., starting of handover) or triggered by the scheduling control comments from the base station 130.

Those skilled in the art will appreciate that the various system layers, routines, or modules illustrated in the various embodiments herein may be executable control units (such as the controllers 210, 250 (see FIG. 2)). The controllers 210, 250 may include a microprocessor, a microcontroller, a digital signal processor, a processor card (including one or more microprocessors or controllers), or other control or computing devices. The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by the controllers 210, 250 cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. Consequently, the method, system and portions thereof and of the described method and system may be implemented in different locations, such as the wireless unit, the base station, a base station controller and/or mobile switching center. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. It is therefore evident that the particular embodiments disclosed above may be altered or modified and all such variations are considered within the scope and spirit of the invention. Accordingly, the protection sought herein is as set forth in the claims below.

We claim:

1. A method for controlling a communications system, comprising:

selecting, at a base station, one of a first and second transmission time interval for communications over a channel between the base station and a mobile unit, the mobile unit being permitted to transmit a segment of data during the selected transmission time interval, the duration of the first transmission time interval being longer that the duration of the second transmission time interval, and the selection being based on information indicating a channel quality of the channel;

sending a request to the mobile unit to use the selected first or second transmission time interval; and determining the information indicating the channel quality of the channel.

2. The method, as set forth in claim 1, wherein determining the information indicating a channel quality of the channel further comprises determining received power and interference power of the channel.

3. A method, as set forth in claim 2, wherein determining the information indicating the channel quality comprises-determining a ratio of the received power and the interference power of the channel.

4. A method, as set forth in claim 3, wherein sending the request to the mobile unit comprises sending a request to the mobile unit to transmit at the first transmission time interval in response to the ratio being less than a first preselected value.

5. A method, as set forth in claim 3, wherein sending the request to the mobile unit comprises sending a request to the mobile unit to transmit at the second transmission time interval in response to the ratio being greater than a first preselected value.

6. A method, as set forth in claim 1, further comprising defining a reference sub-frame counter for both the first and second transmission time intervals.

7. A method, as set forth in claim 1, wherein the duration of the first transmission time interval is about 10 ms and the duration of the second transmission time interval is about 2 ms.

8. A method for controlling a communications system, comprising:

determining at least one operating characteristic of a channel between a first and second device by determining received power and interference power of the channel and determining a ratio of the received power and the interference power of the channel;

selecting one of a first and second transmission time interval for communications over a channel based on at least one operating characteristic of the channel; and sending a request to a mobile device to transmit at the second transmission time interval in response to the ratio being greater than a first preselected value_using an E-DCH Transport Format Indication (E-TFI) field to indicate the selected one of the first and second transmission time intervals.

9. A method, as set forth in claim 8, further comprising using a first portion of the E-TFI field to indicate the transport format and a second portion of the E-TFI field to indicate signaling control information.

10. A method, as set forth in claim 8, further comprising defining a physical channel sub-frame structure for both the first and second transmission time intervals.

* * * * *